(12) United States Patent
Zimmerman

(10) Patent No.: US 11,288,590 B2
(45) Date of Patent: Mar. 29, 2022

(54) AUTOMATIC GENERATION OF TRAINING SETS USING SUBJECT MATTER EXPERTS ON SOCIAL MEDIA

(71) Applicant: International Business Machines Corporation, Armonk, NY (US)

(72) Inventor: Thomas G Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1233 days.

(21) Appl. No.: 15/163,286

(22) Filed: May 24, 2016

(65) Prior Publication Data
US 2017/0344899 A1 Nov. 30, 2017

(51) Int. Cl.
G06F 15/18 (2006.01)
G06N 20/00 (2019.01)
G06F 16/2455 (2019.01)

(52) U.S. Cl.
CPC ......... *G06N 20/00* (2019.01); *G06F 16/2455* (2019.01)

(58) Field of Classification Search
CPC .......... G06N 99/005; G06F 17/30864–30873; G06F 17/30477; G06F 17/30598; G06F 17/30601
USPC ........................................ 706/12, 13, 45–61
See application file for complete search history.

(56) References Cited

U.S. PATENT DOCUMENTS

| | | | | |
|---|---|---|---|---|
| 2011/0035377 A1* | 2/2011 | Wang | ...................... | G06F 16/95 707/737 |
| 2011/0072046 A1* | 3/2011 | Chi | ...................... | G06F 16/3349 707/773 |
| 2011/0258150 A1* | 10/2011 | Neogi | ...................... | G06K 9/72 706/12 |
| 2013/0159254 A1* | 6/2013 | Chen | ................... | G06F 16/9535 707/639 |
| 2014/0279798 A1* | 9/2014 | Purohit | .................. | G06Q 50/01 706/47 |
| 2015/0106304 A1* | 4/2015 | Gupta | ...................... | G06N 5/04 706/11 |

(Continued)

FOREIGN PATENT DOCUMENTS

WO   2015013436 A2   1/2015

OTHER PUBLICATIONS

Thongsuk et al. "Classifying Business Types from Twitter Posts Using Active Learning", 2010, 10th International Conference on Innovative Internet Community Systems.*
Bhattacharya et al. "Inferring User Interests in the Twitter Social Network", 2014, Proceedings of the 8th ACM Conference on Recommender systems.*

(Continued)

*Primary Examiner* — Jue Louie
(74) *Attorney, Agent, or Firm* — Jeffrey S LaBaw; William Stock; Randall Bluestone

(57) ABSTRACT

A method, apparatus and computer program product for automatically generating training sets for machine learning. A set of topics to train a machine learning system is provided. A set of subject matter expert follower sites is identified. Each of the subject matter expert follower sites is about a respective topic of the set of topics and allows followers to post content. The content posted by followers of a respective subject matter expert follower site on the internet is retrieved. The retrieved follower posted content is used to train the machine learning to recognize common features of the retrieved follower posted content of followers having an interest in a respective topic of the set of topics.

18 Claims, 9 Drawing Sheets

(56) References Cited

U.S. PATENT DOCUMENTS

| | | | |
|---|---|---|---|
| 2015/0120718 A1 | 4/2015 | Luo et al. | |
| 2015/0269162 A1* | 9/2015 | Nakata | G06F 16/93 707/749 |
| 2015/0356127 A1* | 12/2015 | Pierre | G06F 16/2228 707/706 |
| 2016/0117397 A1* | 4/2016 | Bansal | G06F 16/9535 707/723 |
| 2016/0140186 A1* | 5/2016 | Langen | G06F 16/337 707/723 |
| 2016/0203523 A1* | 7/2016 | Spasojevic | G06Q 30/0269 705/14.66 |
| 2016/0299992 A1* | 10/2016 | Cetintas | G06F 16/951 |
| 2016/0359790 A1* | 12/2016 | Zhang | G06F 16/285 |
| 2017/0075991 A1* | 3/2017 | Kataria | G06F 16/358 |
| 2017/0147676 A1* | 5/2017 | Jaidka | G06F 16/35 |
| 2017/0185666 A1* | 6/2017 | Pasternack | G06F 16/285 |
| 2017/0220577 A1* | 8/2017 | Pal | G06F 16/24578 |
| 2017/0228588 A1* | 8/2017 | Castillo | G06F 16/93 |

OTHER PUBLICATIONS

Pennacchiotti et al. "Democrats, Republicans, and Starbucks Aficionados: User Classification in Twitter", 2011, KDD '11: The 17th ACM SIGKDD International Conference on Knowledge Discovery and Data Mining.*

Kapanipathi et al. "User Interests Identification on Twitter Using a Hierarchical Knowledge Base", 2014, ESWC 2014: The Semantic Web: Trends and Challenges.*

Fattane Zarrinkalam, "Semantics-Enabled User Interest Mining", 2015, ESWC 2015: The Semantic Web. Latest Advances and New Domains.*

Zhang et al. "Community Discovery in Twitter Based on User Interests", 2012, Journal of Computational Information Systems.*

Cinar et al. "Inferring User Interests on Social Media from Text and Images", 2015, 2015 IEEE 5th International Conference on Data Mining Workshops.*

Xie et al. "Mining User Interests from Personal Photos", 2015, Proceedings of the AAAI Conference on Artificial Intelligence.*

* cited by examiner $G_{TECH} = W_{SWEAR}, W_{HUMAN}, W_{ANX}, W_{ANGER} \ldots W_{BIO}$ $G_{FINANCE} = W_{SWEAR}, W_{HUMAN}, W_{ANX}, W_{ANGER} \ldots W_{BIO}$ $G_{SPORT} = W_{SWEAR}, W_{HUMAN}, W_{ANX}, W_{ANGER} \ldots W_{BIO}$

*FIG. 4*

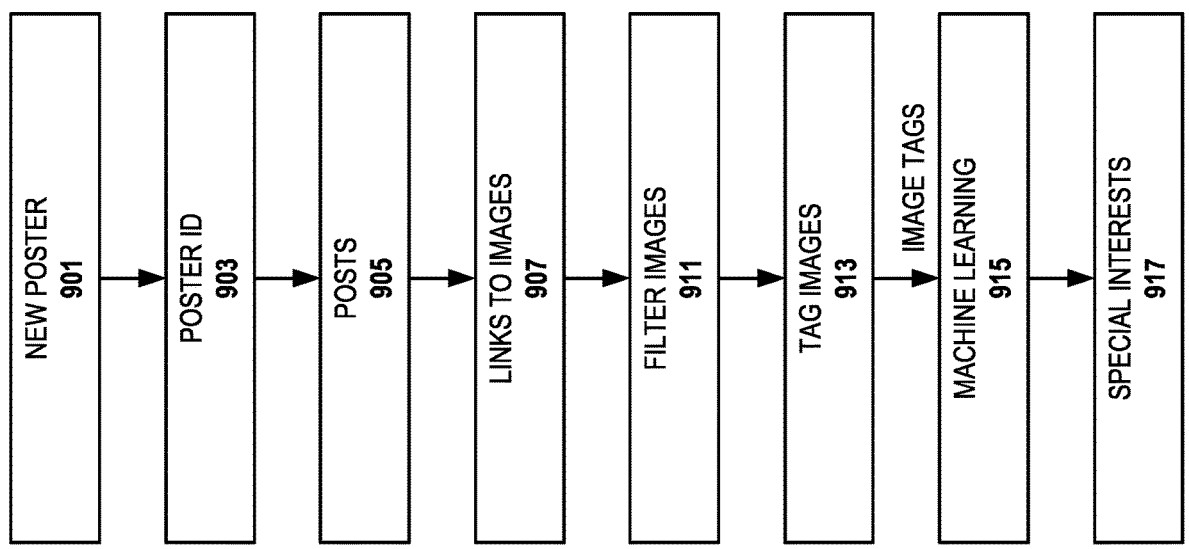

AUTOMATIC GENERATION OF TRAINING SETS USING SUBJECT MATTER EXPERTS ON SOCIAL MEDIA

BACKGROUND OF THE INVENTION

This disclosure relates generally to machine learning. More particularly, it relates to generating training information from information available on social media, or a similar source on the Internet.

There is a plethora of information available on the Internet, covering every subject imaginable. A challenge is to locate the desired information and, once found, interpret the information correctly. A number of search tools exist for finding information on the Internet using a variety of search algorithms such as those operated by the Google Corporation. The result of a search is typically thousands of results which need to be interpreted by a human user.

Machine learning algorithms have been employed to interpret natural language, including natural language posted on the Internet. A major problem with machine learning is that the systems need to be trained. To train a machine learning system, a training set is generally required for each particular topic of interest. Often the training set is provided by collecting information about the topics one wants to predict by surveying a group of individuals. Unfortunately, the survey process is both time consuming and difficult, as a group of people must cooperate by filling out a survey. Often the group of people to be surveyed are experts in the topic, and consequently very busy. Each time new topics are to be predicted by machine learning, a new survey must be issued.

Thus, improved methods of machine learning are desired.

BRIEF SUMMARY

According to this disclosure, a method, apparatus and computer program product for automatically generating training sets for machine learning. A set of topics to train a machine learning system is provided. A set of subject matter expert sites is identified. Each of the subject matter expert sites allows followers to read content posted on the internet by the subject matter expert about a respective topic of the set of topics. The site also allows followers of a respective subject matter expert to upload follower posted content that can be retrieved by observers. The retrieved follower posted content is used to train the machine learning to recognize common features of the retrieved follower posted content of followers having an interest in a respective topic of the set of topics.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 4 illustrates an example of a set of vectors for summarizing the usage of words in three subject areas according to an embodiment of the invention;

FIG. 9 is a flow diagram of predicting a user's special interests using image tags according to another embodiment of the invention.

DETAILED DESCRIPTION OF AN ILLUSTRATIVE EMBODIMENT

At a high level, in preferred embodiments of the invention, the present invention provides an automatic means of generating training sets for machine learning about a subject, or set of subjects, and predicting an interest of an individual based on the machine learning. Unlike the prior art which uses surveys to generate the training sets, embodiments of invention use the postings of subject matter experts (SMEs), or "pundits", who write about a particular topic or subject, to attract a group of people ("followers") who are interested and read the writings of the pundit. The invention uses features extracted from the content posted by the followers to generate a training set. When a new subject is added to the machine learning, the web sites of one or more SMEs are identified and the posted content of people who follow the writings of the SMEs are harvested for features and utilized in machine learning to train a new subject classifier. In embodiments of the invention, the machine learning is used to predict subjects such as interests, activities and shopping habits of a user based on user postings.

Figure 1:
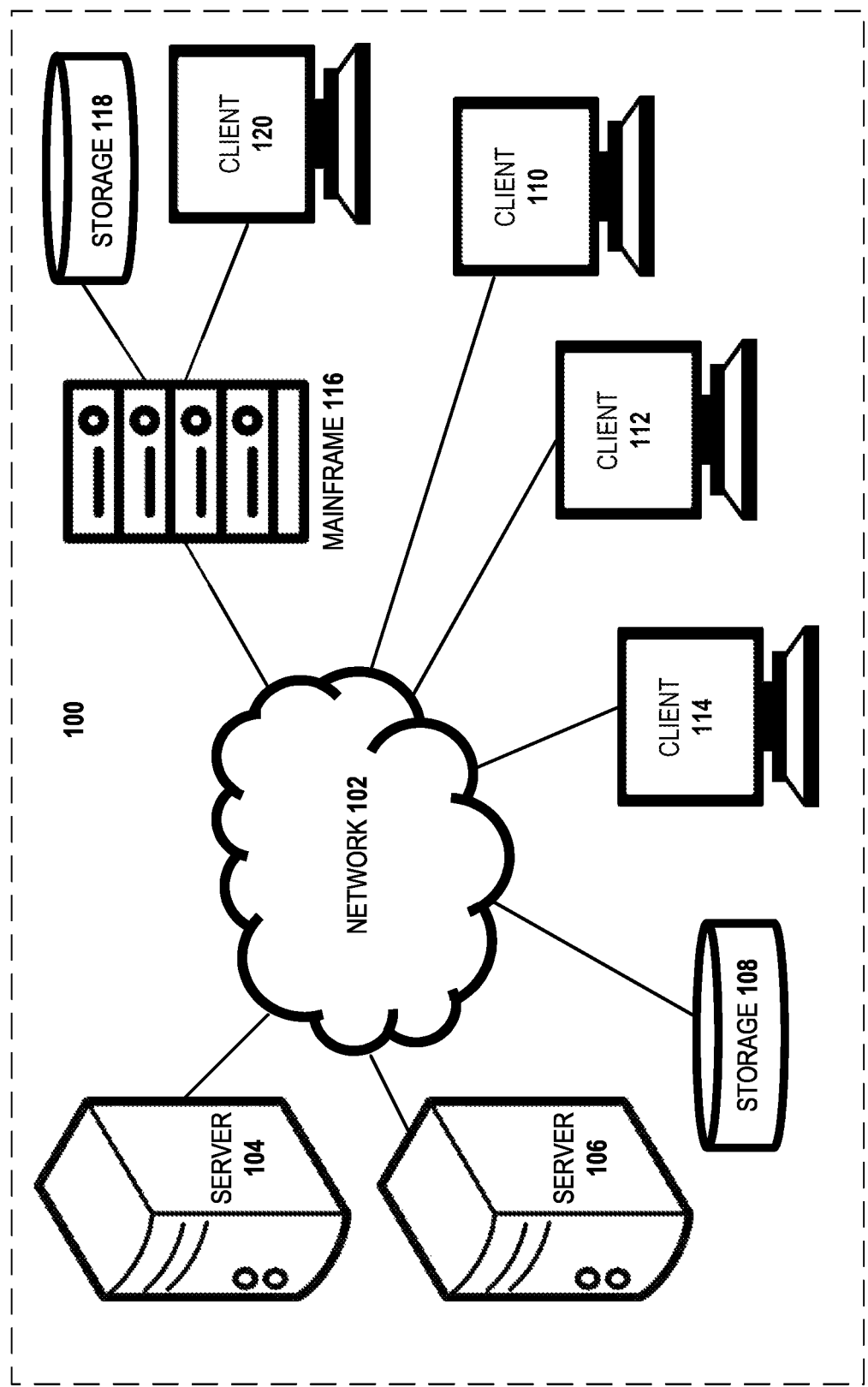
FIG. 1 depicts an exemplary block diagram of a distributed data processing environment in which exemplary aspects of the illustrative embodiments may be implemented.
Figure 2:
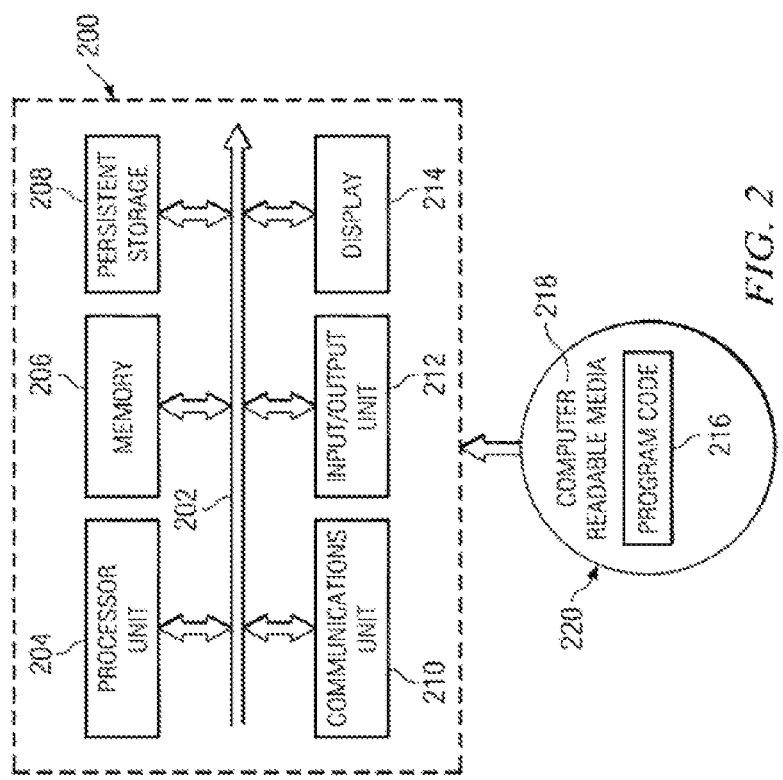
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the drawing, mainframe computer 116 is shown connected to network 102. Mainframe computer 116 can be, for example, an IBM System z mainframe running the IBM z/OS operating system. Connected to the mainframe 116 are mainframe storage unit 118 and client 120. Client 120 is either a PC connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages such as Python or C. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

The invention teaches a method to perform machine training on a new topic or trait using the information which individuals have provided in their posts on the Internet, for example, on social media. This offers advantages over the prior art where surveys or other time consuming actions are required to train a machine. The invention can be used for text-based analysis of topics and traits, and may be extended to other means of human communication and expression, such as images.

Prior art often uses surveys to collect a training set. The current invention uses the convenience of a "pundit". A pundit is a subject matter expert (SME) or at least one who holds himself out to be an expert, who writes on the Internet about a particular topic or subject. Rather than use the postings of the pundit, who may be quite idiosyncratic in the way in words are used, the invention uses the posts of a group of "followers" of the pundit. The group of people ("followers") who read the writings of the pundit are likely interested in the topic and their postings are more likely to represent an "average" individual interested in the topic. The followers post need not directly address or discuss the topic or subject of the SME. Rather, it is the common traits that followers share that are trained in machine learning, however idiosyncratic the association between the followers content and the SME subject or topic. As discovered by the inventor, the followers of an SME tend to use similar language in their posts, post similar links in their posts and post similar collections of photos. A new individual's interests in a machine trained topic or subject can be predicted by determining which group of followers share substantially similar language, links and photo collections as posts by the new individual. In preferred embodiments, the SME does not have to be a person. It can be a particular site where followers who share a common interest congregate to consume and share writing, images and other communication and expressions. So a more general term used by the application is a "subject matter expert follower site" which is intended to include both a site where a particular individual posts who has a set of followers as well as a web site about a specific subject matter having a set of followers.

In a preferred embodiment, the invention uses web sites and social media which post the writings of existing pundits and followers. Unlike prior art, the invention does not require the active participation of people, for example, in surveys. Instead, the invention finds and observes the postings of selected followers to train machine learning algorithms. In preferred embodiments, the process is automated such that a topic of interest can be specified or selected by a user, and the selection of followers and analysis of their postings and subsequent training of machine learning algorithms can be performed by a machine.

To practice the invention, a user first inputs a new subject to be added to a set of trained subjects. In embodiments of the invention, the user can first search for a list of pundits who, or web sites that, frequently post opinions and related commentary about the particular subject, field or interest to the user. However, in preferred embodiments of the invention, the search is automatic once the user enters a new subject. As is known in the prior art, the user can enter search term, and automatic Natural Language Processing (NLP) techniques can be used to expand the search for synonyms and similar terms.

In embodiments of the invention, Twitter™ is a preferred social media platform to use as a source of information.

However, any Internet platform that provides a means to identify the followers of a pundit that posts messages, allows the followers to post contributions and a means to download the contributions of the followers, e.g., Tweets, can be used in embodiments of the invention. Twitter™ provides an easy mechanism to automate the search of pundits for a new topic X. The new topic X is entered, and the topic X is entered into a set of search templates (one or more search templates). The search template can be simple, such as "best [new topic] follow twitter" so that the search terms become "best X follow twitter" or it can be a more complicated set of templates and an expanded set of set of synonyms for "topic X". The populated search templates are automatically searched using a set of search engines e.g., a single standard search engine. The query(ies) will provide search results including top hits with titles such as "Best X to follow on Twitter", "10 Twitter Accounts Every X Fan Should Follow", and "The 50 Best X Twitter Accounts to Follow". Embodiments of the invention parse the results to identify a set of top hits which are a set of subject matter expert accounts which pertain to new topic X. The set of accounts is preferably a subset of the total number of pundits identified by the search hits. In embodiments of the invention, the set of accounts include a minimum number of subject matter experts on a given topic. Using a single pundit for a new topic may lead to misleading results. For example, the followers of a particular pundit may like the pundit for their humor and not specifically because of the particular subject or topic. By using a plurality of SMEs, the noise created by those who follow for reasons other than interest in the subject or topic is diminished by the majority of SME and follower who post and view the content, respectively, because of interest in the subject or topic. Further, in embodiments, a maximum number of pundit accounts may be predetermined to reduce the computations in the following steps.

Once a set of pundit accounts for a new subject of interest are discovered, filtered and identified, a representative sample of followers is selected for training the machine learning system. The contributions of the selected followers are retrieved. In embodiments of the invention, a larger number of followers (e.g., 1000) for each pundit than the number of pundits (e.g., 10) are selected. A set of feature extractors are applied to the content retrieved from the selected followers, such as word usage statistics, personality derived from text, and objects identified in images. For example, Linguistic Inquiry and Word Count (LIWC) is used in embodiments for deriving personality from word frequency. Other embodiments use IBM Multimedia Analysis and Retrieval System (IMARS), Visual Insights and AlchemyAPI for detecting objects in images. The output of the set of features extractors is applied to machine learning to classify the extracted features to the subject of interest. While embodiments of the invention use a variety of machine learning techniques, preferred embodiments of the invention use classifying techniques such as k-means clustering and Support Vector Machines (SVM) to determine a subject of interest from a set of trained subjects of interest using features extracted from the posted content of followers of the respective subjects of interest.

Embodiments of the invention use the content posted by followers of a subject matter expert to train machine learning algorithms. The features extracted from the content are collected and associated with the subject of interest for future use. Once trained, the system uses the learning to predict the subject of interests of a social media poster, by extracting features of the content of the social media poster, such as linguistic and image collection patterns indicating a similarity to the content posted by others with a disposition to favor a particular subject or set of subjects.

Figure 3:
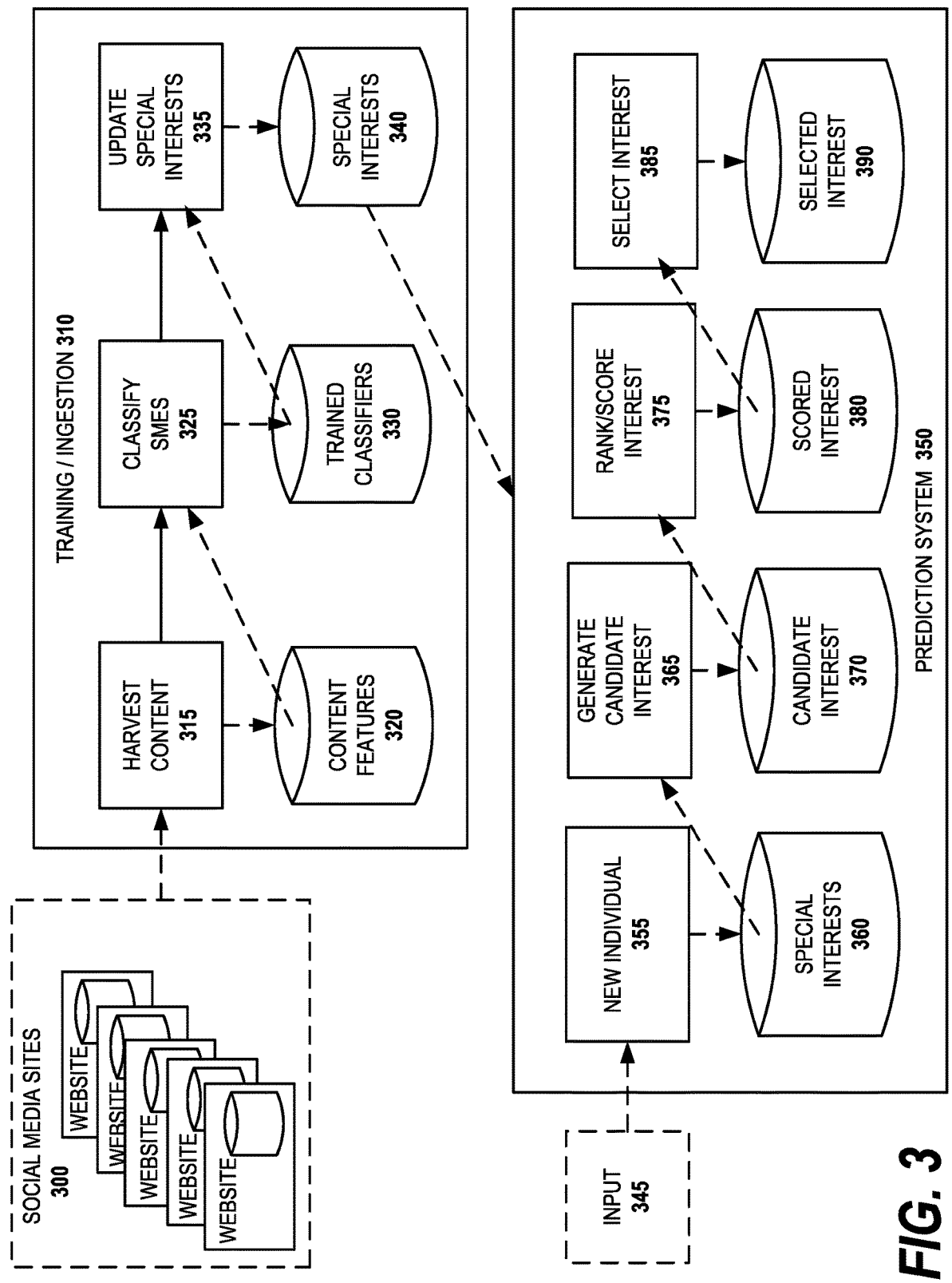
FIG. 3 illustrates a more detailed exemplary computer environment in which the disclosed subject matter may be implemented.

FIG. 3 illustrates a more detailed exemplary computer environment in which the disclosed subject matter may be implemented. The drawing is a component diagram depicting the various components in a preferred embodiment using online discussions to train a machine learning system as well as using the trained system to make decisions about the likely interests of a new user. Social media sites 300 can include any number of web sites with online discussions, such as forums or the like, on a specific topic. In a preferred embodiment, the online discussion site is that of a pundit who writes on a particular topic which also includes a comment facility to which users, i.e. followers, may post content. In the invention, the term "subject matter expert follower site" is used to describe a site with followers who are identified as interested in a specific topic, often, but not always, led by a subject matter expert. In a preferred embodiment, two phases are used: a training phase and an answer or prediction phase. Training or ingestion phase 310 is used to analyze posts from social media sites 300 and update a set of trained special interest correlations. The prediction phase is handled by prediction system 350 that utilizes the correlations provided by the training phase 310 to identify predicted interests. In other embodiment of the invention, the prediction system is used to predict the likely subject interest group membership of a social media poster, activities or shopping habits of the poster.

Training ingestion 310 commences with the features process 315 that downloads the followers' content and extract features using a set of feature detectors and stores the harvested features in data store 320. The diagram presumes that the selection process of the SMEs has already occurred. Next, a classification process 325 is used to classify the followers' posted content based on the SMEs to which the followers have subscribed and the subject or topic about which that SME is an expert or is writing. The set of trained classifiers are shown being stored in data store 330. The updating process 335 updates the special interest classes 340 available for use by the prediction system 350. In one preferred embodiment, the features, e.g., word frequency of occurrences or objects detected in a collection of posted images, for followers' posts of a particular topic or SME for a topic is stored as a feature vector where elements of the vector represent a type and frequency of occurrence of a feature, e.g., a word category or object in image. If this is the first time the process is run, only one corpus of follower content is harvested and stored in data store, e.g., as a feature vector. However, in embodiments of the invention, a continual or periodic update process is performed to create improved as well as possibly changing sets of features, to improve or change the resulting predictions. That is, the follower content is retrieved on a scheduled periodic basis. For example, word usage for followers of a certain SME may change in time to account for new technology or events or posts by the SME. In different embodiments of the invention, new posts from the same set of followers which were sampled before are retrieved and added, and re-training is performed. In other embodiments, the most active followers' posts are retrieved, so that a recent active follower will replace a prior follower who is not currently active. The newly retrieved follower posted content would then be fed into the machine learning system and the extracted features associated with the respective topic of SME. Different embodiments of the invention would store the new correlations either separately from old correlations, merged with the old correlations or to replace the old correlations. A sequence of correlation feature vectors can be logged to study changing features such as word usage and image collections.

The second major component is the prediction system 350 which is used to predict the interests of a new individual. Input 345 such as the posts of a new individual poster are received by prediction system 350 in process 355 that performs a feature extraction on the content posted by the new individual poster. In preferred embodiments, the process 355 uses the same type of feature extraction and machine learning used to create the trained classifiers 330. In one preferred embodiment, the input 345, e.g., new individual posted content, is analyzed and converted into a feature vector having similar elements to the ones used to create the trained classifiers 330. The identified special interest features are stored (as a feature vector or other format) in data store 360.

Next, process 365 performs the classification prediction, using the special interest classes 340 to generating a prediction of membership of the input 345 to each of the special interests 340. Depending on the application, one or more interests are in the set of predicted interests, and different types of predictions, e.g., interest groups, shopping habits, may be included. The set of predicted interests are related to, but not necessarily identical to, the set of topics used to train the machine learning. The candidate interests are stored in data store 370. Process 375 is performed to rank and score the candidate interests using a variety of factors, including the confidence of membership of input 345 to each of the special interests 340. The result of process 375 is a set of scored candidate interests that are stored in data store 380. For example, in embodiments of the invention, the top three predicted interests may be desired. Finally, process 385 selects the interest(s) based on the scores, e.g., the candidate interest(s) with the highest classification confidence(s). Those candidate interests having the highest classification confidences are deemed to have a substantial match according to the scoring algorithms. Note that the match does not need to be exact. In preferred embodiments, a substantial match occurs when the predicted interest is at or above a configurable confidence level. Optionally, a log of selected interests is kept for audit and analysis purposes in data store 390. The selected interest is transmitted to the user of the prediction system. The user of the prediction system may be a human user or may be an application such as an ad server.

FIG. 4 illustrates an example of a set of feature vectors summarizing the usage of words in three subject areas according to an embodiment of the invention. As was mentioned above, in embodiments of the invention, Linguistic Inquiry and Word Count (LIWC) is used for deriving emotional and personality features from word frequency used by followers of SMEs. The results of the LIWC analysis can be summarized as a feature vector. For ease in illustration, the summary is shown as three feature vectors, respectively representing followers of tech SMEs, finance SMEs and sport SMEs. Each vector is shown with five separate elements, respectively representing word usage frequency in different LIWC categories, Wswear or swear words, Whuman or words about human characteristic, Wanx or words indicating anxiety, Wanger or words indicating anger and Wbio or words indicating biological processes. In preferred embodiments of the invention, there would be more vectors representing more interests and more elements representing different types of word usage according to the LIWC standard. In embodiments, the elements of the vectors represent frequency of word usage in a normalized format to account for sample size in the retrieved posts of the followers of the respective SMEs.

As an illustrative example, suppose that nine subjects of interest are established (technology, financial, animal lovers, fashion, gardening, extreme sports, organic food, video games and beer and wine) and three pundits are selected for each subject for a total of twenty-seven pundits. Twitter™ is used to retrieve a sample set. The number of posts per follower is also limited to as an attempt to normalize the results by retrieving a roughly equal sample set for each pundit and each subject. For follower posted content which are not in the target language, i.e. English, the follower posted content is discarded. After retrieving a selected number of followers' posts, the system performs text analysis on the retrieved posts using LIWC2007 (or other analysis mechanism such as Yoshikoder or Antconc) to identify word usage features. Machine learning, e.g., using an SVM algorithm, to learn correlations between the topics and the word usage features of the followers of the topics.

The analysis of word categories reveals distinct language patterns among the different groups. For example, animal lovers use very few swear words while video game enthusiasts use an excess of swear words in their social media posts.

The results show that after training on the most frequently used words in the LIWC categories, for each subject of interest, and membership of an individual in one of the twenty-seven follower groups (9 subjects times 3 follower groups per subject), the interests for a new poster were successfully identified at over 4 times the probability of a random guess for the correct SME and over 3 times the probability of a random guess for the correct subject of interest.

Figure 5:
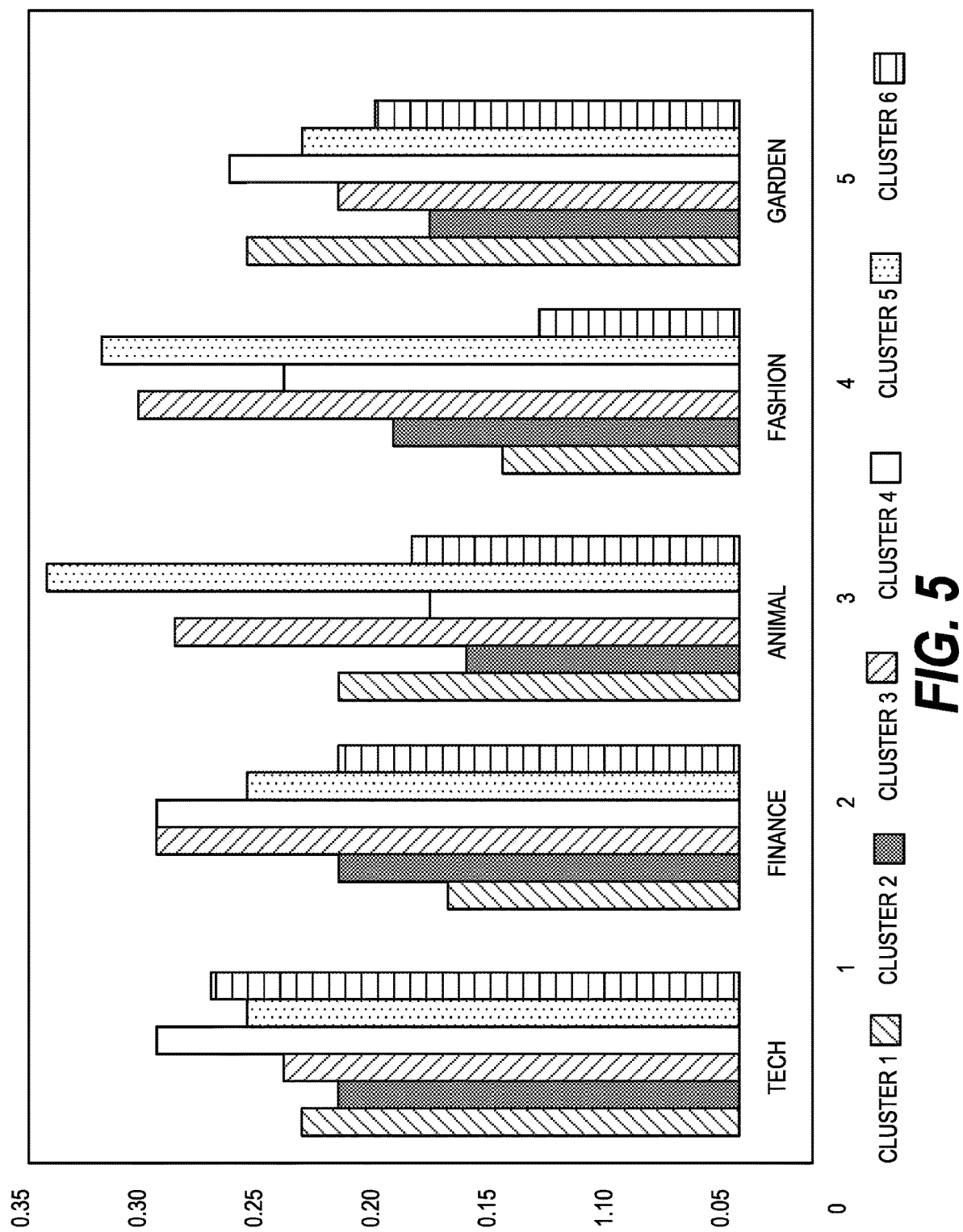
FIG. 5 illustrates an example of a set of cluster vectors summarizing the usage of images in five areas according to an embodiment of the invention.

The identified features can be stored and used in a number of ways. FIG. 5 illustrates an example of a set of cluster vectors summarizing the usage of image features in five areas according to an embodiment of the invention. Thus, rather than using a separate element for each discovered feature, the discovered features can be clustered together and each cluster element is used as an element of the vector.

As is mentioned above, the training method is applied to image features in other embodiments of the invention. Followers of the SMEs are often afforded the opportunity to post images, either as a link or actual image, in the responses to the SME postings. One process for identifying image features is IBM Multimedia Analysis and Retrieval System (IMARS). IMARS examines a set of images according to 61 different image features. When an analysis for clustering error for 61 image features for 37K images across different numbers of clusters of the image features, 6 clusters is estimated to be the optimal number, based on the "elbow" of the error curve. From these clusters, cluster vectors can be created for embodiments of the invention. In FIG. 5, the cluster vectors for image features are shown in bar graph form. As can be seen in the drawing, the amplitude of the respective cluster elements and shape of the overall vector differs between the tech, finance, animal lovers, fashion and garden follower groups.

Analysis of clustering error shows that there is an "elbow" in the clustering error curve at six clusters. That is, there are diminishing returns using more clusters to describe the image features. So in embodiments of the invention which are bounded by storage space or processor speed, using cluster vectors can be preferred. However, using all of the feature detectors is more accurate, and therefore, preferred for embodiments which require greater accuracy.

Figure 6:
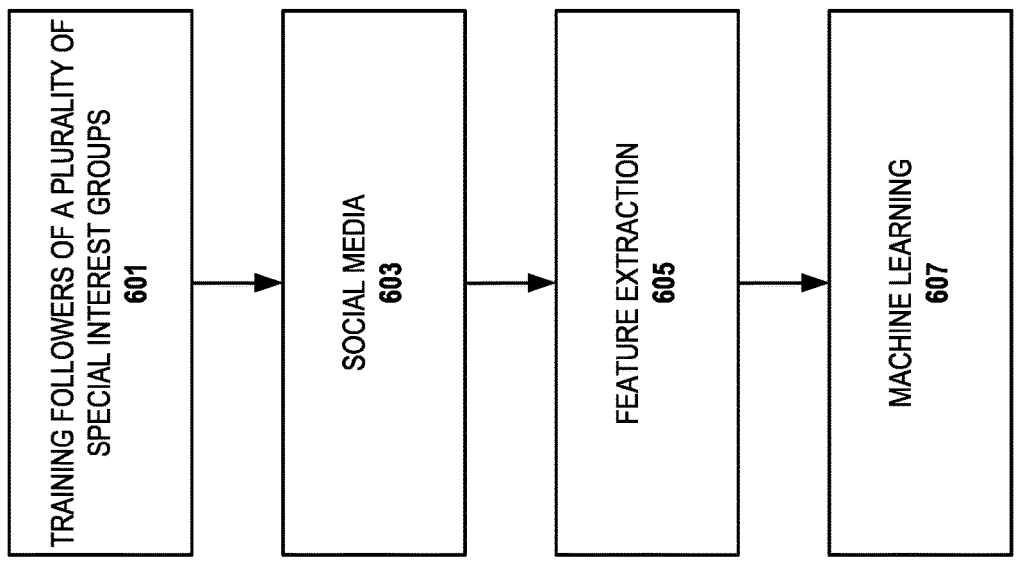
FIG. 6 illustrates a flow diagram of training a machine learning program using features according to an embodiment of the invention.

FIG. 6 illustrates a flow diagram of training a machine learning program using features according to an embodiment of the invention. In preferred embodiments of the invention, a Support Vector Machine (SVM) machine learning model is used to predict interests using features. A plurality of followers are identified in step 601 for training the system. The SMEs and their respective followers may be input by a user. However, in preferred embodiments of the invention, the followers are automatically identified in response to the input of a set of topics or group interests. The followers are associated with the SME or the group interest presented by the SME on the internet. As has been mentioned above a minimum number of SMEs are selected and a minimum and maximum number of followers and posts per follower are used as system constraints in embodiments of the invention.

Next, in step 603, a set of the posts of the followers are harvested from social media. In step 605, the features are extracted using a feature extraction technique from the retrieved follower posted content. LIWC can be used for emotional content of word frequency. Latent semantic indexing (LSI) topic model can be used to identify semantically related terms to derive conceptually based features. IMARS can be used to identify objects in images posted by followers. However, one skilled in the art will understand that other feature extraction methods can be used in embodiments of the invention. The identified features are fed as a learning set into the machine learning model 607, e.g., SVM, running on the system. Together with the identified features, the group interests of the followers are fed into the machine learning system so that the correlations between the identified features and the corresponding topic or group interest are made by the machine learning system. Optionally, the SME followed by the follower can be input with the group interest so that independent correlations between respective SMEs within the group interest can be made as well. At the conclusion of the analysis, the system is trained to recognize features used in the posted content of the followers of respective group interests and SMEs posting about those group interests. These features can be stored as vectors as described above.

Figure 7:
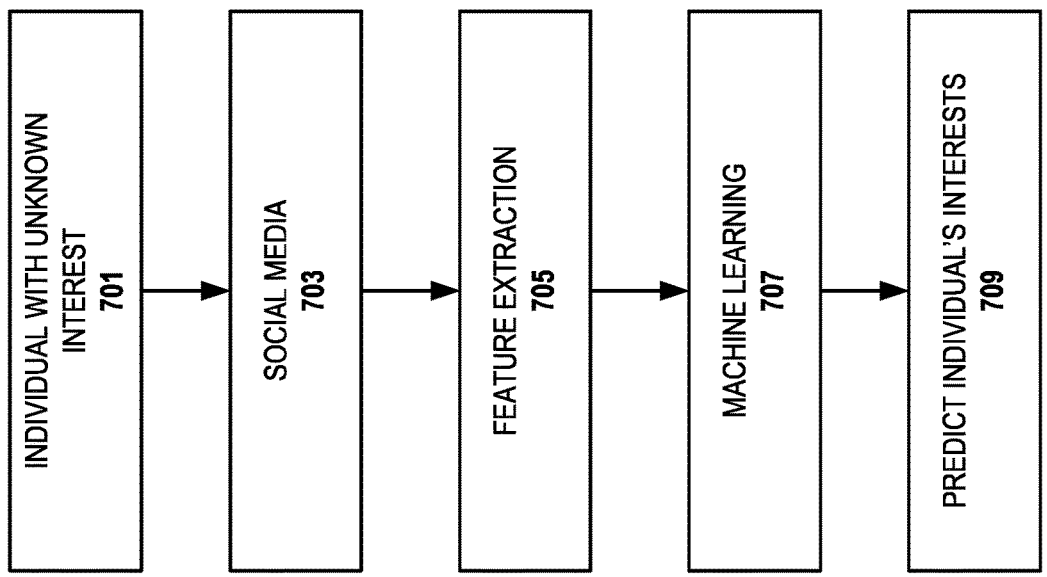
FIG. 7 illustrates a flow diagram of predicting a user's special interests using features according to an embodiment of the invention.

FIG. 7 illustrates a flow diagram of predicting a new individual's interests using the identified features according to an embodiment of the invention. In step 701, the new individual/poster is identified for whose interests are to be predicted. In step 703, the user's social media posted content is harvested. In preferred embodiments, the same social media web site is used to retrieve both the new individual posted content and to derive the social interest feature vectors. Users tend to write differently on different web sites given different user interface constraints, e.g., the 140 character limit in Twitter™. However, if there are insufficient posts in the same social media web site, posted content can be used on other sites in the Internet. In step 705, the features are extracted from the new individual's posted content. In the preferred embodiment, the same feature extraction method is used as that originally used to develop a training set for the machine learning system. In step 707, the extracted features are analyzed and predicted by the previously trained machine learning algorithm. In the preferred embodiment, the same machine learning algorithm used to derive the vectors during training is used for prediction.

In step 709, the new user/subject interests are predicted. As mentioned above, the prediction might be group membership, interests or shopping habits. The set of predicted interests are related to, but not necessarily identical to, the set of topics used to train the machine learning. For example, suppose that it was known that video game enthusiasts were also often interested in paint ball guns and science fiction movies. These latter two subjects could be reported to the user as a predicted interest. Comparing feature vectors is a generalized comparison method frequently used in machine learning systems, however, those skilled in the art will recognize that other comparison methods can be used in alternative embodiments of the invention. If there is a substantial match between the feature vector created from the new individual's posted content and the retrieved follower posted content from a set of subject matter expert follower sites, the new individual is predicted to have a similar set of interests.

Figure 8:
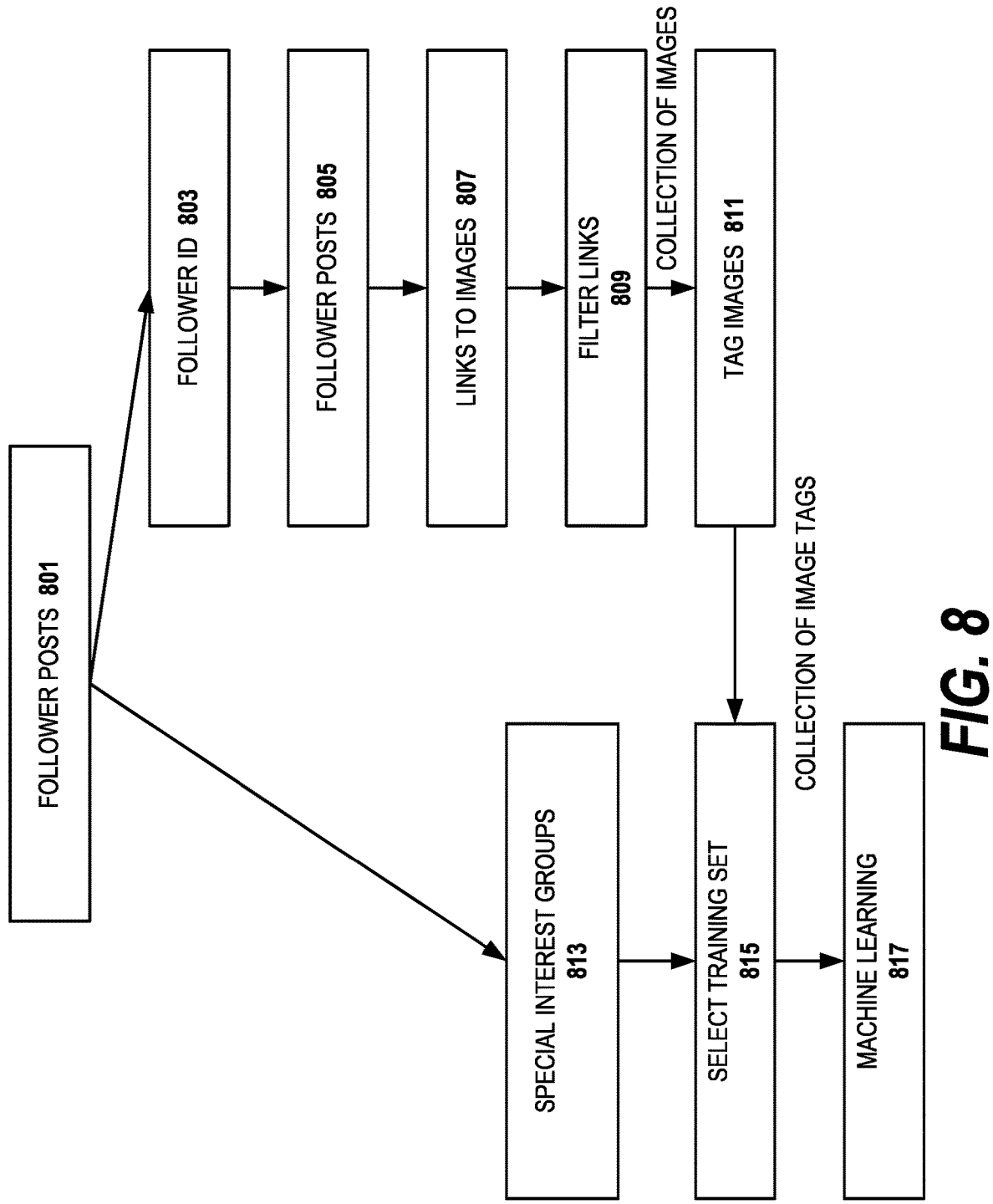
FIG. 8 illustrates a flow diagram training a machine learning program using image tags according to another embodiment of the invention.

FIG. 8 illustrates a flow diagram training a machine learning program using image tags according to another embodiment of the invention. The process begins in step 801 where the SMEs, the followers of the SMEs and posts of the followers of the SMEs are selected according the selected subjects of interest. In one preferred embodiment, Twitter™ is a preferred social media web site for collecting the postings of followers of an SME. A Twitter™ Group or Twitter™ list is a curated group of Twitter accounts. A Twitter™ account holder can create their own Twitter™ list or subscribe to a list created by others. A group list of Twitter™ accounts often contains a list of users which have the same interests. In step 803, the follower IDs, e.g., Twitter™ IDs is selected. Twitter ID is a number used by Twitter to identify a user as contrasted to the username which is prefaced by an "@" symbol. Subscribing to a Twitter account is called "following". "Followers" are Twitter users who have followed a user (such as a pundit) to receive that user's Tweets. In step 805, the follower posts, e.g., Tweets, of the selected group of follower are retrieved. In step 807, the links or URLs are identified within the follower posts and examined to determine whether they refer to images posted on the Internet. In Twitter™, a Twitter™ Message is called a Tweet can contain 140 characters and links to photos and videos, such as a URL to the photo or video.

In step 809, a collection of images is retrieved which are linked to posts from the user's account. In preferred embodiment, a filtering set is performed to locate images which the user is most likely to have taken, as opposed to images which have been taken by other, potentially non-follower individuals. It has been the inventor's observation that in Tweets from the Twitter™ social media web site that URLs from twitter.com or a related web site Instagram™, i.e. Instagram.com, is often used to store a user's pictures as opposed to pictures from a third party.

In step 811, image analysis is performed to collect a set of image features for each of the selected posted images. In one preferred embodiment, the IBM Alchemy API is used to generate image tags to identify image features. The Alchemy API produces image tags which allows the invention to quickly categorize and organize images by identifying objects within the image such as animals, manmade objects and landscape features. The Alchemy API generates confidence scores for the image tags so that the images can be classified accurately. Typically, a plurality of image tags, e.g., 5 image tags, is associated with each image. In alternative embodiments, other image feature extractors such as IMARS, can be used to identify image features. These image feature extractors may or may not generate data structures called image tags, but equivalent data structures. In other embodiments, LSI topic, psychological traits profile or emotion VAD (valence, arousal, dominance) word feature extractors can be used to extract non-image features.

In step 813, the special interest groups (or SMEs) are identified so that correlations between the SME and the collection of image tags can be made. Together with the set of special interest groups (or list of SMEs) from which the images are derived, the collection of image tags are used in step 815, to construct the training set. In step 817, the training set is input into the machine learning system, for example, an SVM machine learning system so that correlation between the image features and tags are made. Other machine learning systems include Logistic, Naïve Bayes and Random Forest Classifiers.

FIG. 9 is a flow diagram of predicting a user's special interests using image tags according to another embodiment of the invention. In step 901, a new individual is identified. In step 903, the individual's social media accounts, e.g., his Twitter™ ID, is retrieved. In step 905, the individual's postings, e.g., Tweets, are retrieved. In step 907, the links to images, i.e. URLs, are identified within the postings. In step 911, the image links are optionally filtered for web sites most likely to have individual poster originated images, that is, images taken by the follower. The filtered images are retrieved from the social media site or other Internet site. In step 913, the extraction of image features is performed. For example, a set of image tags, representing image features, can be produced by the IBM Alchemy API.

In step 915, the set of image features or tags extracted for the images posted by the individual are compared to the those image tags from the images of the followers of the SMEs by using the machine learning program. In preferred embodiments, the machine learning uses the same process used to correlate the image tags of the followers to the interest groups. Finally in step 917, the set of special interests for the new individual are produced. The set of predicted special interests may include group interest membership, common psychological or emotion profile or shopping habits or interests.

In other embodiments of the invention, a plurality of different types of features may be used to identify the interests of a new poster. That is, in one preferred embodiment, both a correlation of word usage and a separate correlation of image features to group interest membership is made to increase the predictive capabilities of the embodiment.

The present invention has many advantages over the prior art. The invention teaches a means to perform training for machine learning using individuals' inputs, using their posts on social media, without requiring any additional action, e.g., fill out a survey. The invention enables new traits to be added without a survey. The invention can be used for text-based analysis of traits and may be extended to other means of human communication and expression, such as images.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described my invention, what I now claim is as follows:

1. A method for automatically generating training sets for a machine learning system comprising:
    providing a set of topics to train the machine learning system;
    using the set of topics to automatically identify a set of subject matter expert follower sites, each subject matter expert follower site about a respective topic of the set of topics and allowing followers to post content;
    retrieving follower posted content from a plurality of followers from each of the identified subject matter expert follower sites; and
    using the retrieved follower posted content as a training set to train the machine learning system to recognize a set of common features of the retrieved follower posted content of followers having an interest in each of the respective topics of the set of topics wherein the trained machine learning system can predict that a respective individual will have an interest in at least one topic in the set of topics by comparing common features of the retrieved follower posted content having an interest in a topic of the set of topics to features of a plurality of postings of the respective individual;
    wherein a first machine learning algorithm is used to identify common features of the retrieved follower posted content and the first machine learning algorithm is used to compare features of the respective individual posted content to the common features of the retrieved follower posted content, wherein the compared common features include a plurality of common word usage features, common link usage features in links to image documents and common image features in linked image documents, wherein the compared common image features are a set of image features derived from images that the followers have linked within the retrieved follower posted content and a filtering is performed to determine a set of images most likely to have been taken by one of the plurality of followers or the respective individual.

2. The method as recited in claim 1, further comprising:
    identifying a first individual for predicting an interest in the plurality of topics by the first individual;
    retrieving postings made by the first individual;
    by the trained machine learning system, comparing features of the first individual posted content to the common features of the retrieved follower posted content of followers having an interest in a respective topic of the set of topics; and
    predicting that the first individual has an interest related to a respective topic if there is a match according to a scoring algorithm, wherein the respective topic is one of the plurality of topics and one of the set of topics.

3. The method as recited in claim 2, further comprising: scoring topics within the set of topics according to the comparison between features of the first individual posted content to the common features of the retrieved follower posted content of followers having an interest in each respective topic of the set of topics.

4. The method as recited in claim 1, wherein identifying a set of subject matter expert follower sites, further comprises:
    retrieving a search template;
    populating the search template with respective ones of the set of topics to produce a set of populated search templates;
    using the populated search templates to conduct a search to produce a set of search results; and
    parsing the set of search results for the set of subject matter expert follower sites.

5. The method as recited in claim 1, further comprising:
    identifying a first predetermined minimum plurality of subject matter expert follower sites per topic in the set of topics;
    identifying a second predetermined minimum number of followers of a respective subject matter expert follower site in the set of subject matter expert follower sites; and
    retrieving a predetermined amount of posted content of a respective identified follower.

6. The method as recited in claim 1, wherein retrieved follower posted content from a first subject matter expert follower site is used to train the first machine learning algorithm and the posted content made by the first individual is retrieved from the first subject matter expert follower site.

7. Apparatus, comprising:
    a processor;
    computer memory holding computer program instructions executed by the processor for automatically generating training sets for machine learning, the computer program instructions comprising:
        program code, operative to provide a set of topics to train a machine learning system;
        program code, operative to use the set of topics to identify a set of subject matter expert follower sites, each subject matter expert follower site about a respective topic of the set of topics and allowing followers to post content;
        program code, operative to retrieve follower posted content from a plurality of followers from a respective subject matter expert follower; and
        program code, operative to use the retrieved follower posted content as a training set to train the machine learning system to recognize a set of common features of the retrieved follower posted content of followers having an interest in each of the respective topics of the set of topics wherein the trained machine learning system can predict that a respective individual will have an interest in a plurality of topics related to topics in the set of topics by comparing the sets of common features of the retrieved follower posted content having an interest in a topic of the set of respective topics to features of a plurality of postings of the respective individual;
        wherein a first machine learning algorithm is used to identify common features of the retrieved follower posted content and the first machine learning algorithm is used to compare features of the respective individual posted content to the common features of the retrieved follower posted content, wherein the compared common features include a plurality of common word usage features, common link usage features in links to image documents and common image features in linked image documents, wherein the compared common image features are a set of image features derived from images that the followers have linked within the retrieved follower posted content and a filtering is performed to determine a set of images most likely to have been taken by one of the plurality of followers or the respective individual.

8. The apparatus as recited in claim 7, further comprising:
program code, operative to identify a first individual for predicting an interest in the plurality of topics by the first individual;
program code, operative to retrieve posted content made by the first individual;
program code, operative to provide the retrieved posted content to the trained machine learning system to compare features of the first individual posted content to the common features of the retrieved follower posted content of followers having an interest in a respective topic of the set of topics; and
program code, operative to predict that the first individual has an interest related to a respective topic if there is a match according to a scoring algorithm, wherein the respective topic is one of the plurality of topics and one of the set of topics.

9. The apparatus as recited in claim 8, and the apparatus further comprises program code, operative to score topics within the set of topics according to the comparison between features of the first individual posted content to the common features of the retrieved follower posted content of followers having an interest in each respective topic of the set of topics.

10. The apparatus as recited in claim 7, further comprising:
program code, operative to schedule retrieval of the follower posted content on a periodic basis;
program code, operative to use the periodically retrieved follower posted content to train the machine learning to recognize common features of the retrieved follower posted content;
program code, operative to update the common features for a respective topic of the set of topics according to the periodically retrieved follower posted content.

11. The apparatus as recited in claim 10, wherein the machine learning system uses a Support Vector Machine mechanism.

12. The apparatus as recited in claim 7, further comprising:
program code, operative to automatically populate a search template with a topic to produce a populated search template; and
program code, operative to use the populated search template to conduct a search to retrieve a set of subject matter expert follower sites which contain follower posted content on the topic.

13. A computer program product comprising a non-transitory computer readable medium for use in a data processing system, the computer readable medium holding computer program instructions executed by the data processing system for automatically generating training sets for machine learning, the computer program instructions comprising:

program code, operative to provide a set of topics in which respective individuals have an interest to train a machine learning system;
program code, operative to use the set of topics to identify a set of subject matter expert follower sites, each subject matter expert follower site about a respective topic of the set of topics and allowing followers to post content;
program code, operative to retrieve follower posted content from a plurality of followers from a respective subject matter expert follower site; and
program code operative to use the retrieved follower posted as a training set to train the machine learning system to recognize a set of common features of the retrieved follower posted content of followers having an interest in each of the respective topics of the set of topics wherein the trained machine learning system can predict that a respective individual will have an interest in a plurality of topics related to topics in the set of topics by comparing the common features of the retrieved follower posted content having an interest in a topic of the set of respective topics to features of a plurality of postings of the respective individual;
wherein a first machine learning algorithm is used to identify common features of the retrieved follower posted content and the first machine learning algorithm is used to compare features of the respective individual posted content to the common features of the retrieved follower posted content, wherein the compared common features include a plurality of common word usage features, common link usage features in links to image documents and common image features in linked image documents, wherein the compared common features are a set of image features derived from images that the followers have linked within the retrieved follower posted content and a filtering is performed to determine a set of images most likely to have been taken by one of the plurality of followers or the respective individual.

14. The computer program product as recited in claim 13, further comprising:
program code, operative to identify a first individual for predicting an interest in a plurality of topics by the first individual;
program code, operative to retrieve posted content made by the first individual;
program code, operative to provide the retrieved posted content to the trained machine learning system to compare features of the first individual posted content to the common features of the retrieved follower posted content of followers having an interest in a respective topic of the set of topics; and
program code, operative to predict that the first individual has an interest related to a respective topic if there is a match according to a scoring algorithm, wherein the respective topic is one of the plurality of topics.

15. The computer program product as recited in claim 13, further comprising:
program code, operative to identify image links within the retrieved follower posted content;
program code, operative to filter the image links according to a set of web sites most likely to store individual poster originated images; and
program code, operative to extract a set of image features derived from image links within the follower posted content.

16. The computer program product as recited in claim 13, further comprising:

program code, operative to send the predicted interest to an ad server.

17. The computer program product as recited in claim 13, wherein the compared common features are expressed as a feature vector.

18. The computer program product as recited in claim 13, wherein the common features of the retrieved follower posted content are organized as clusters of common features.

* * * * *